US012761171B2

(12) United States Patent
Judersleben et al.

(10) Patent No.: US 12,761,171 B2
(45) Date of Patent: Oct. 13, 2026

(54) METHOD FOR MANUFACTURING AN INDUCTIVE CONDUCTIVITY SENSOR AND INDUCTIVE CONDUCTIVITY SENSOR

(71) Applicant: Endress+Hauser Conducta GmbH+Co. KG, Gerlingen (DE)

(72) Inventors: Paul Judersleben, Dresden (DE); André Pfeifer, Schkopau (DE); Christian Fanselow, Geringswalde (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 171 days.

(21) Appl. No.: 18/983,768

(22) Filed: Dec. 17, 2024

(65) Prior Publication Data

US 2025/0208079 A1 Jun. 26, 2025

(30) Foreign Application Priority Data

Dec. 22, 2023 (DE) ..................... 10 2023 136 444.8

(51) Int. Cl.

| | |
|---|---|
| ***G01N 27/02*** | (2006.01) |
| ***G01D 21/02*** | (2006.01) |
| ***G01N 25/18*** | (2006.01) |
| ***G01N 27/04*** | (2006.01) |
| ***G01N 27/08*** | (2006.01) |
| ***G01R 27/08*** | (2006.01) |

(52) U.S. Cl.

CPC ........... *G01N 27/025* (2013.01); *G01D 21/02* (2013.01)

(58) Field of Classification Search

CPC ........ G01N 27/02; G01N 27/04; G01N 27/08; G01N 25/18; G01D 21/02; G01R 27/08

See application file for complete search history.

(56) References Cited

U.S. PATENT DOCUMENTS

| | | | | |
|---|---|---|---|---|
| 7,070,724 | B2 | 7/2006 | Nakazawa | |
| 10,928,341 | B2 * | 2/2021 | Nagel | G01N 27/025 |
| 2014/0167790 | A1 * | 6/2014 | Pechstein | G01N 27/06 427/553 |

FOREIGN PATENT DOCUMENTS

| | | | |
|---|---|---|---|
| DE | 102014111265 | A1 | 2/2016 |
| DE | 102015108613 | A1 | 12/2016 |
| DE | 102018107130 | A1 | 9/2019 |
| JP | 6134388 | A | 2/1986 |

* cited by examiner

*Primary Examiner* — Neel D Shah

(74) *Attorney, Agent, or Firm* — Mark A. Logan; Endress+Hauser (USA) Holding, Inc.

(57) ABSTRACT

An inductive conductivity sensor comprises an electronics unit including a printed circuit board, a transmitter coil, a receiver coil, and a temperature sensor. A first through-hole is arranged between a first axial end and a second axial end of the printed circuit board, and a second through-hole is arranged between the first axial end and the first through-hole, so that a bracket is formed between the first axial end and the second through-hole. A temperature sensor is arranged on the bracket. The transmitter coil and receiver coil are arranged on opposite sides of the printed circuit board around the first through-hole. A housing encloses the electronics unit in a fluid-tight manner so that the first through-hole and the second through-hole each allow at least partial passage of a fluid therethrough.

10 Claims, 3 Drawing Sheets

METHOD FOR MANUFACTURING AN INDUCTIVE CONDUCTIVITY SENSOR AND INDUCTIVE CONDUCTIVITY SENSOR

CROSS-REFERENCE TO RELATED APPLICATION

The present application is related to and claims the priority benefit of German Patent Application No. 10 2023 136 444.8, filed on Dec. 22, 2023, the entire contents of which are incorporated herein by reference.

TECHNICAL FIELD

The present disclosure relates to a method for manufacturing an inductive conductivity sensor and to an inductive conductivity sensor.

BACKGROUND

Inductive conductivity sensors are used in a variety of applications in the laboratory and in process measurement technology to measure the conductivity of a liquid measuring medium. They are preferably used where large measuring ranges and high chemical or thermal loads occur. This is the case, for example, in a variety of industrial chemical processes, but also in hot steam sterilization processes, which are often used in the food technology sector due to the high hygiene requirements.

An inductive conductivity sensor comprises a transmitter coil and a receiver coil, which are usually designed as ring coils, also referred to as toroidal coils. Such a conductivity sensor functions as a double transformer, wherein the transmitter coil and the receiver coil are introduced into the measuring medium far enough that a closed current path running through the measuring medium and involving the transmitter and the receiver coils can be created. When the transmitter coil is excited with an alternating voltage signal, it generates a magnetic field that induces a current in the closed medium path involving the coils, the strength of which depends upon the electrical conductivity of the measuring medium. Since this alternating electrical current in the medium in turn generates a varying magnetic field that surrounds it, an alternating current is induced in the receiver coil. This alternating current and the corresponding alternating voltage respectively, which are delivered by the receiver coil as an output signal, are a measure of the electrical conductivity of the measuring medium.

Since the electrical conductivity of a measuring medium depends upon the temperature of the measuring medium, it is crucial to measure the temperature with the highest precision at the same time and, if possible, at the same location where the conductivity measurement takes place.

SUMMARY

It is therefore an object of the present disclosure to provide an inductive conductivity sensor and a method for its manufacture, which has a reliable, stable, and simply designed temperature sensor.

This object is achieved according to the present disclosure by an inductive conductivity sensor and by a manufacturing method.

The inductive conductivity sensor according to the present disclosure comprises:

an electronics unit comprising a printed circuit board, a transmitter coil, a receiver coil, and a temperature sensor, wherein the printed circuit board extends along a first axis and has a first axial end and a second axial end, wherein the printed circuit board has a first board side and a second board side, a first through-hole, and a second through-hole, wherein the first through-hole is arranged between the first axial end and the second axial end of the printed circuit board, and the second through-hole is arranged between the first axial end and the first through-hole, so that a bracket is formed between the first axial end and the second through-hole, wherein the temperature sensor is arranged on the bracket, wherein the transmitter coil is arranged on the first board side around the first through-hole, and the receiver coil is arranged on the second board side around the first through-hole;

a housing which encloses the electronics unit in a fluid-tight manner, so that the first through-hole and the second through-hole each allow at least partial passage of a fluid therethrough.

The inductive conductivity sensor according to the present disclosure allows for its temperature sensor to be optimally exposed to the fluid to be measured, which leads to optimal temperature sensitivity. Furthermore, the shape of the bracket ensures maximum stability and maximum robustness against external mechanical influences. Moreover, thanks to the combined design of the housing with the electronics unit, minimal housing thicknesses are possible for optimum sensitivity for conductivity measurement as well as temperature measurement. Furthermore, the symmetrical arrangement of the temperature sensor ensures that the electromagnetic fields of the transmitter coil and receiver coil are minimally influenced.

According to one embodiment of the present disclosure, the housing is integrally connected to the electronics unit by an injection-molding process.

According to one embodiment of the present disclosure, the housing has a housing thickness, and the housing thickness is less than 2 mm, preferably less than 1 mm, at least above the temperature sensor.

According to one embodiment of the present disclosure, the transmitter coil has an inner transmitter coil diameter, the receiver coil has an inner receiver coil diameter, and the first through-hole has a first inner through-hole diameter, wherein the inner transmitter coil diameter and the inner receiver coil diameter are greater than the first inner through-hole diameter.

According to one embodiment of the present disclosure, the first through-hole has a first inner through-hole diameter and the second through-hole has a second inner through-hole diameter, wherein the second inner through-hole diameter is equal to the first inner through-hole diameter or greater than the first inner through-hole diameter.

The aforementioned object is also achieved by a method for manufacturing an inductive conductivity sensor.

The method according to the present disclosure comprises:

providing an electronics unit and an injection mold, wherein the electronics unit has a printed circuit board, a transmitter coil, a receiver coil, and a temperature sensor, wherein the printed circuit board extends along a first axis and has a first axial end and a second axial end, wherein the printed circuit board has a first board side and a second board side, a first through-hole, and a second through-hole, wherein the first through-hole is arranged between the first axial end and the second axial end of the printed circuit board, and the second through-hole is arranged between the first axial end and the first through-hole, so that a bracket is formed between the first axial end and the second through-hole, wherein the temperature sensor is arranged on the bracket, wherein the transmitter coil is arranged on the first board side, and the receiver coil is arranged on the second board side, each around the first through-hole;

fixing the electronics unit relative to the injection mold using a clamping unit, wherein the clamping unit clamps the printed circuit board at a clamping point;

injecting a plastic material to form a housing of the inductive conductivity sensor;

removing the clamping unit;

closing the housing at the clamping point.

According to one embodiment of the present disclosure, the clamping unit clamps the printed circuit board at the first through-hole.

According to one embodiment of the present disclosure, the transmitter coil has an inner transmitter coil diameter, the receiver coil has an inner receiver coil diameter, and the first through-hole has a first inner through-hole diameter, wherein the inner transmitter coil diameter and the inner receiver coil diameter are greater than the first inner through-hole diameter, so that a first annular surface is formed on the first board side, and a second annular surface is formed on the second board side, wherein the clamping unit clamps the printed circuit board on the first annular surface and the second annular surface.

According to one embodiment of the present disclosure, the electronics unit has a first half-shell and a second half-shell, which are arranged such that the transmitter coil and the receiver coil are protected, and the clamping unit clamps the printed circuit board, the first half-shell, and the second half-shell when fixing the electronics unit.

According to one embodiment of the present disclosure, a welding mandrel and a welding cover are used when closing the housing at the clamping point, wherein the welding mandrel and the welding cover are welded to the housing by means of an ultrasonic process.

BRIEF DESCRIPTION OF THE DRAWINGS

The present disclosure will be explained in more detail on the basis of the following description of the figures. In the figures.

DETAILED DESCRIPTION

The inductive conductivity sensor 100 according to the present disclosure shown in FIGS. 1 to 4 comprises an electronics unit 10 and a housing 60.

Figure 2:
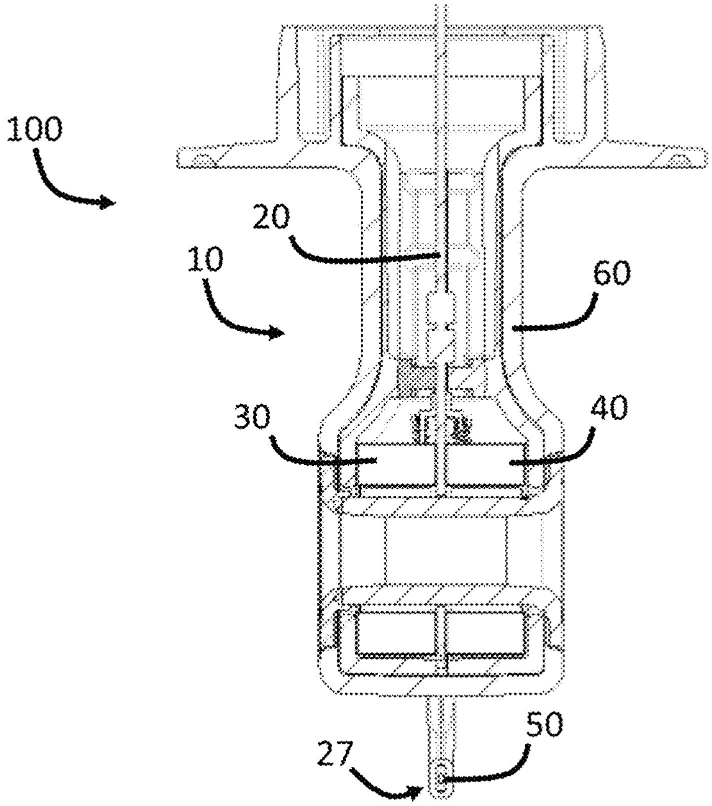
FIG. 2 shows a sectional representation of the inductive conductivity sensor shown in FIG. 1.

The electronics unit 10 comprises a printed circuit board 20, a transmitter coil 30, a receiver coil 40, and a temperature sensor 50 (see FIG. 2). The electronics unit 10 preferably further comprises a first half-shell H1 and a second half-shell H2, which in particular surround temperature- and/or pressure-sensitive components (see FIG. 4). When placed on top of each other, the first half-shell H1 and the second half-shell H2 preferably have a substantially toroidal shape. This ensures that the transmitter coil 30 and the receiver coil 40 are ideally protected by the two half-shells H1, H2.

The printed circuit board 20 extends along a first axis Z (see FIG. 3) and has a first axial end 21 and a second axial end 22.

The printed circuit board 20 has a first board side 23 and a second board side 24, a first through-hole 25, and a second through-hole 26.

The first through-hole 25 is arranged between the first axial end 21 and the second axial end 22 of the printed circuit board, and the second through-hole 26 is arranged between the first axial end 21 and the first through-hole 25, so that a bracket 27 is formed between the first axial end 21 and the second through-hole 26. The bracket 27 is preferably designed to be symmetrical to the first axis Z. Preferably, the bracket 27 has the same outer radius as the transmitter coil 30 and the receiver coil 40 (see FIG. 1).

Figure 1:
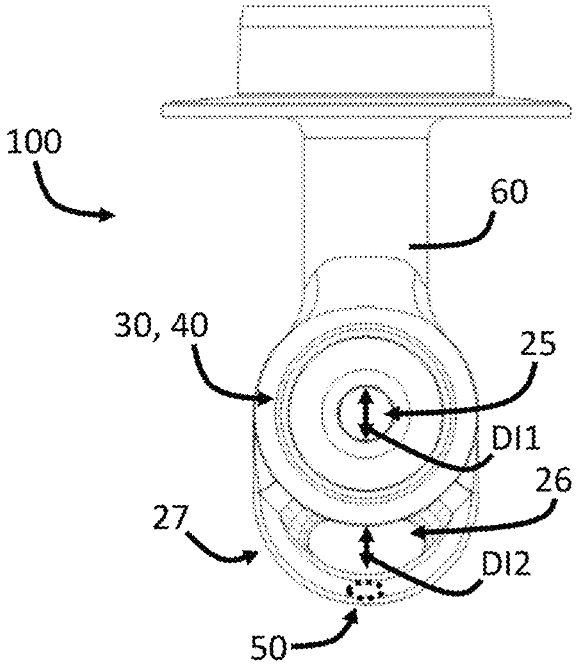
FIG. 1 shows an exemplary representation of an inductive conductivity sensor according to the present disclosure.

The temperature sensor 50 is arranged on the bracket 27. The temperature sensor 50 is preferably arranged centrally on the bracket 27, i.e., along the first axis Z. This enables a symmetrical arrangement of the temperature sensor 50 on the inductive conductivity sensor 100. In FIG. 1, the temperature sensor 50 is covered by the housing 60, which is why the temperature sensor 50 is shown in dashed lines.

The transmitter coil 30 is arranged on the first board side 23 around the first through-hole 25, and the receiver coil 40 is arranged on the second board side 24 around the first through-hole 25.

The housing 60 encloses the electronics unit 10 in a fluid-tight manner, so that the first through-hole 25 and the second through-hole 26 each allow at least partial passage of a fluid therethrough. The housing 60 is integrally connected to the electronics unit 10 by an injection-molding process. Preferably, the electronics unit 10 has shield elements (not shown) at least in part in order to be protected against electromagnetic interference fields. The housing 60 has a housing thickness GD, and the housing thickness GD is less than 2 mm, preferably less than 1 mm, at least above the temperature sensor 50.

The transmitter coil 30 has an inner transmitter coil diameter SI, the receiver coil 40 has an inner receiver coil diameter EI, and the first through-hole 25 has a first inner through-hole diameter DI1. According to one embodiment of the present disclosure, the inner transmitter coil diameter SI and the inner receiver coil diameter EI are preferably greater than the first inner through-hole diameter DI1. This implies that a first annular surface RF1 is formed on the first board side 23, and a second annular surface RF2 is formed on the second board side 24.

The first through-hole 25 has a first inner through-hole diameter DI1, and the second through-hole 26 has a second inner through-hole diameter DI2.

According to the embodiment shown in FIG. 1, the second inner through-hole diameter DI2 is equal to the first inner through-hole diameter DI1 or greater than the first inner through-hole diameter DI1.

Next, the method according to the present disclosure for manufacturing the inductive conductivity sensor 100 described above will be discussed.

First, the electronics unit 10 described above and an injection mold (not shown) are provided. According to an advantageous step, the first half-shell and the second half-shell H1, H2 are then welded together by means of ultrasound. This makes it possible, in particular, to fix the printed circuit board 20 and to protect the transmitter coil 30 and the receiver coil 40 from injection pressure. Of course, the injection mold has a mold surface which corresponds to the shape of the housing 60 of the inductive conductivity sensor 100 and allows for accommodating the electronics unit 10. In the region of the first through-hole 25, the injection mold has a recess complementary to a clamping unit 200.

Figure 3:
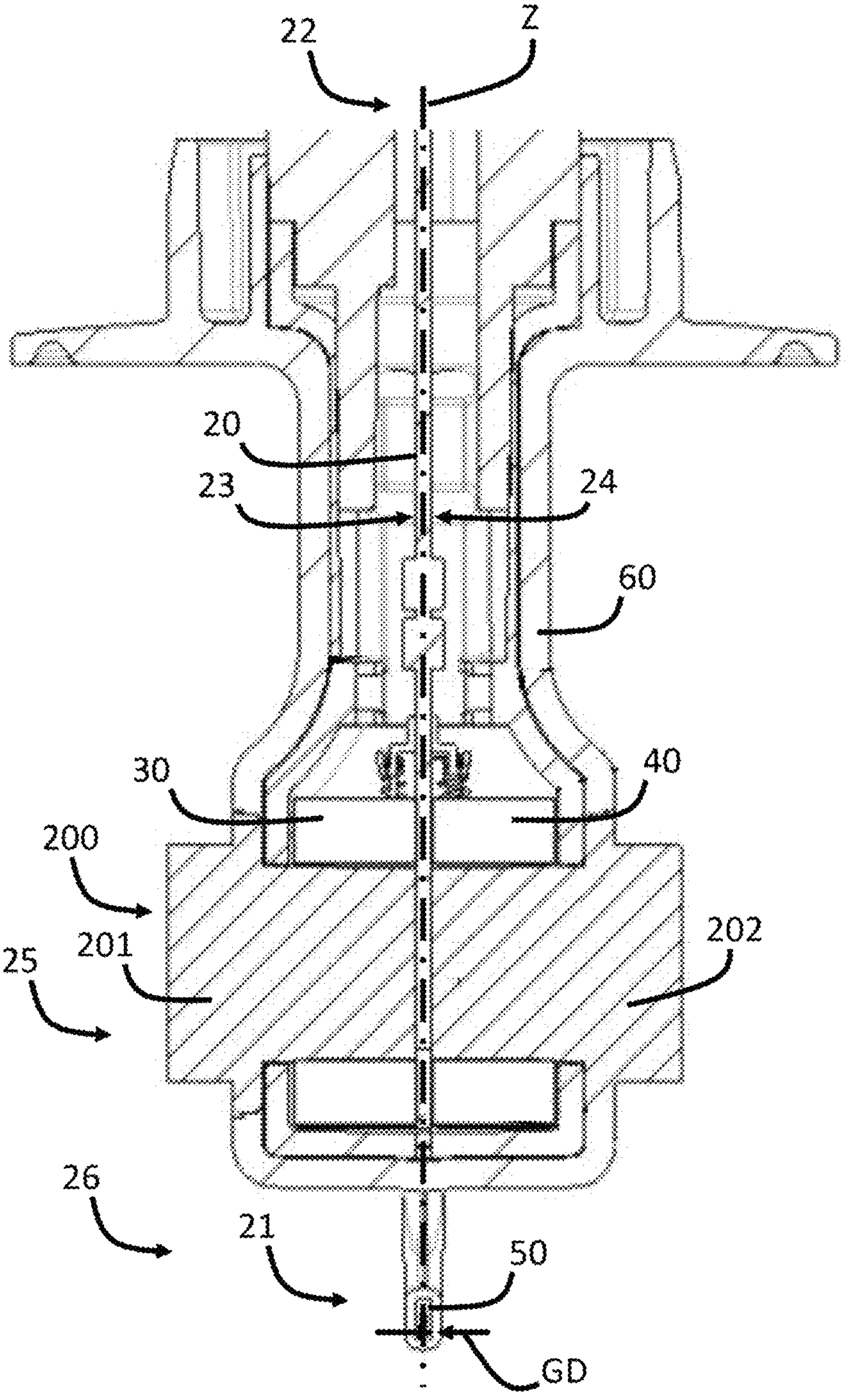
FIG. 3 shows an exemplary representation of the manufacture of the inductive conductivity sensor shown in FIG. 1.

The electronics unit 10 is then fixed relative to the injection mold using the clamping unit 200 (see FIG. 3). The clamping unit 200 comprises, for example, a first tool core 201 and a second tool core 202. The clamping unit 200 clamps the printed circuit board 20 and/or preferably the two half-shells H1, H2 at a clamping point. The clamping unit 200 preferably clamps the printed circuit board 20 at the first through-hole 25.

Figure 4:
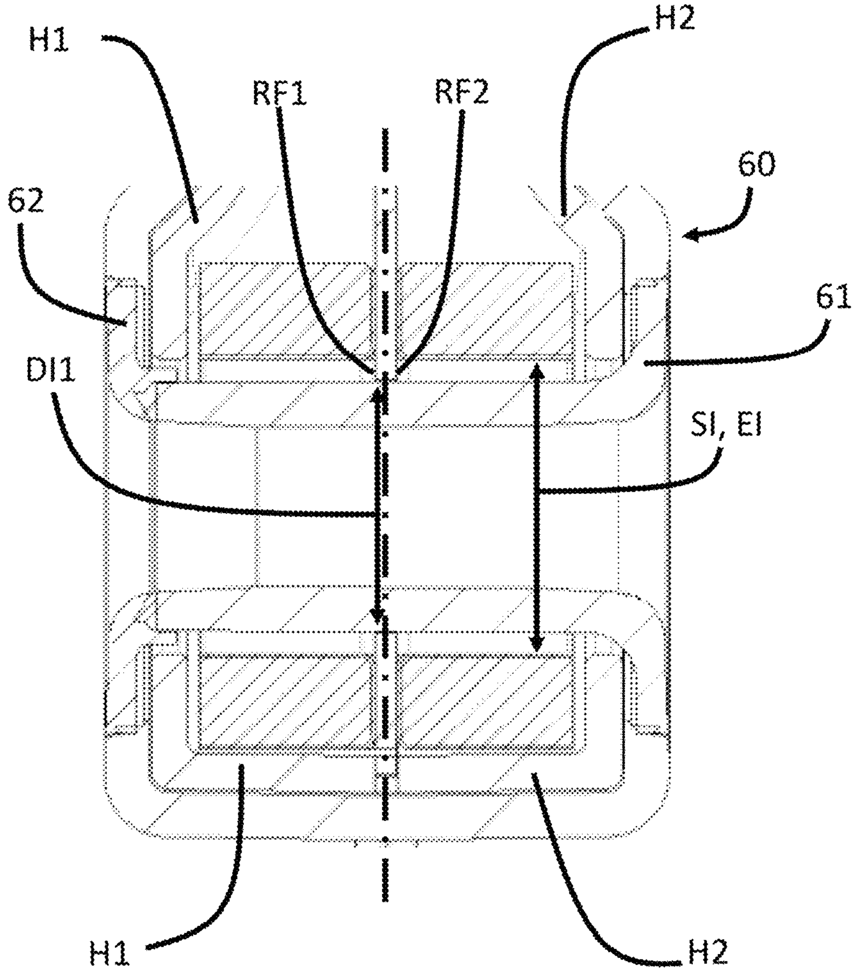
FIG. 4 shows an enlarged cutout of the inductive conductivity sensor shown in FIG. 2.

In the case that the inner transmitter coil diameter SI and the inner receiver coil diameter EI are greater than the first inner through-hole diameter DI1, so that a first annular surface RF1 is formed on the first board side 23 and a second annular surface RF2 is formed on the second board side 24, the clamping unit 200 preferably clamps the printed circuit board 20 on the first annular surface RF1 and the second annular surface RF2 (see FIG. 4).

Next, a plastic material is injected to form the housing 60 of the inductive conductivity sensor. The plastic material is preferably PEEK. Injection into the injection mold is preferably carried out in the area of a flange of the housing 60. The clamping unit 200 seals the injection mold tightly in the area of the recess of the injection mold.

The clamping unit 200 is then removed. Here, the first tool core 201 and the second tool core 202 are preferably removed from the printed circuit board 20 transversely to the first axis Z. After removing the clamping unit 200, the printed circuit board 20 and/or preferably the first and second half-shells H1 and H2 are exposed at the clamping point.

The housing 60 is then closed at the clamping point. This means that the area which could not be overmolded to hold the printed circuit board 20 is now also closed. The clamping point is preferably closed by means of a welding mandrel 61 and a welding cover 62 (see FIG. 4). An ultrasonic welding process is preferably used to close the housing 60 with the aid of the welding mandrel 61 and of the welding cover 62. Of course, other joining methods known to those skilled in the art can also be used, such as gluing, provided that they are compatible with the applicable hygiene regulations.

The invention claimed is:

1. An inductive conductivity sensor, comprising:

an electronics unit including a printed circuit board, a transmitter coil, a receiver coil, and a temperature sensor, wherein the printed circuit board extends along a first axis and has a first axial end and a second axial end, wherein the printed circuit board has a first board side and a second board side, a first through-hole, and a second through-hole, wherein the first through-hole is arranged between a first axial end and a second axial end of the printed circuit board, and the second through-hole is arranged between the first axial end and the first through-hole so that a bracket is formed between the first axial end and the second through-hole, wherein the temperature sensor is arranged on the bracket, and wherein the transmitter coil is arranged on the first board side around the first through-hole, and the receiver coil is arranged on the second board side around the first through-hole, the inductive conductivity sensor further comprising:

a housing that encloses the electronics unit in a fluid-tight manner so that the first through-hole and the second through-hole each allow at least partial passage of a fluid therethrough.

2. The inductive conductivity sensor according to claim 1, wherein the housing is integrally connected to the electronics unit by an injection-molding process.

3. The inductive conductivity sensor according to claim 2, wherein the housing has a housing thickness, and the housing thickness is less than 2 mm at least above the temperature sensor.

4. The inductive conductivity sensor according to claim 1, wherein the transmitter coil has an inner transmitter coil diameter, the receiver coil has an inner receiver coil diameter, and the first through-hole has a first inner through-hole diameter, wherein the inner transmitter coil diameter and the inner receiver coil diameter are greater than the first inner through-hole diameter.

5. The inductive conductivity sensor according to claim 1, wherein the first through-hole has a first inner through-hole diameter and the second through-hole has a second inner through-hole diameter, wherein the second inner through-hole diameter is equal to the first inner through-hole diameter or greater than the first inner through-hole diameter.

6. A method for manufacturing an inductive conductivity sensor, comprising:

providing an electronics unit and an injection mold, wherein the electronics unit has a printed circuit board, a transmitter coil, a receiver coil, and a temperature sensor, wherein the printed circuit board extends along a first axis and has a first axial end and a second axial end, wherein the printed circuit board has a first board side and a second board side, a first through-hole, and a second through-hole, wherein the first through-hole is arranged between the first axial end and the second axial end of the printed circuit board, and the second through-hole is arranged between the first axial end and the first through-hole, so that a bracket is formed between the first axial end and the second through-hole, wherein the temperature sensor is arranged on the bracket, and wherein the transmitter coil is arranged on the first board side, and the receiver coil is arranged on the second board side, each around the first through-hole;

fixing the electronics unit relative to the injection mold using a clamping unit, wherein the clamping unit clamps the printed circuit board at a clamping point;

injecting a plastic material to form a housing of the inductive conductivity sensor;

removing the clamping unit; and closing the housing at the clamping point.

7. The method for manufacturing an inductive conductivity sensor according to claim 6, wherein the clamping unit clamps the printed circuit board at the first through-hole.

8. The method for manufacturing an inductive conductivity sensor according to claim 7, wherein the transmitter coil has an inner transmitter coil diameter, the receiver coil has an inner receiver coil diameter, and the first through-hole has a first inner through-hole diameter, wherein the inner transmitter coil diameter and the inner receiver coil diameter are greater than the first inner through-hole diameter, so that a first annular surface is formed on the first board side and a second annular surface is formed on the second board side, wherein the clamping unit clamps the printed circuit board on the first annular surface and the second annular surface.

9. The method for manufacturing an inductive conductivity sensor according to claim 6, wherein the electronics unit has a first half-shell and a second half-shell that are arranged such that the transmitter coil and the receiver coil are protected, and the clamping unit clamps the printed circuit board, the first half-shell, and the second half-shell when fixing the electronics unit.

10. The method for manufacturing an inductive conductivity sensor according to claim 9, wherein a welding mandrel and a welding cover are used when closing the housing at the clamping point, the method further comprising:

welding the welding mandrel and the welding cover to the housing via an ultrasonic process.

* * * * *